(12) United States Patent
Gloster

(10) Patent No.: US 6,558,458 B1
(45) Date of Patent: May 6, 2003

(54) SYSTEMS AND METHODS FOR LITHOGRAPHY

(75) Inventor: Daniel F. Gloster, Somerville, MA (US)

(73) Assignee: American Ink Jet Corporation, Billerica, MA (US)

( * ) Notice: Subject to any disclaimer, the term of this patent is extended or adjusted under 35 U.S.C. 154(b) by 0 days.

(21) Appl. No.: 09/663,286

(22) Filed: Sep. 15, 2000

Related U.S. Application Data

(60) Provisional application No. 60/154,495, filed on Sep. 17, 1999, and provisional application No. 60/175,014, filed on Jan. 7, 2000.

(51) Int. Cl.$^7$ .......................... C09D 11/00; C09D 11/02
(52) U.S. Cl. ............................... 106/31.27; 106/31.58; 106/31.6; 106/31.86
(58) Field of Search .................... 106/31.27, 31.58, 106/31.6, 31.86; 101/466; 347/100

(56) References Cited

U.S. PATENT DOCUMENTS

| | | | |
|---|---|---|---|
| 3,561,961 A | 2/1971 | Blake | 430/264 |
| 3,716,390 A | 2/1973 | Garbarini | 216/41 |
| 3,907,576 A | 9/1975 | Dear et al. | 106/2 |
| 3,910,187 A | 10/1975 | Cords | 101/450.1 |
| 4,443,820 A | 4/1984 | Mutoh et al. | 358/296 |
| 4,668,533 A | 5/1987 | Miller | 427/84 |
| 4,740,495 A * | 4/1988 | Marinelli et al. | 106/31.18 |
| 4,833,486 A | 5/1989 | Zerillo | 347/2 |
| 5,114,744 A | 5/1992 | Cloutier et al. | 427/96 |
| 5,154,121 A | 10/1992 | Schneider | 101/401.1 |
| 5,156,089 A | 10/1992 | McCue et al. | 101/128.4 |
| 5,270,078 A | 12/1993 | Walker et al. | 427/264 |
| 5,270,368 A | 12/1993 | Lent et al. | 524/236 |
| 5,312,654 A | 5/1994 | Arimatsu et al. | 427/511 |
| 5,466,653 A | 11/1995 | Ma et al. | 503/200 |
| 5,495,803 A | 3/1996 | Gerber et al. | 101/401.1 |
| 5,501,150 A | 3/1996 | Leenders et al. | 101/466 |
| 5,621,448 A | 4/1997 | Oelbrandt et al. | 347/96 |
| 5,637,426 A | 6/1997 | Uchikawa | 430/4 |
| 5,662,039 A | 9/1997 | Watanabe et al. | 101/116 |
| 5,695,908 A | 12/1997 | Furukawa | 430/205 |
| 5,738,013 A | 4/1998 | Kellett | 101/463.1 |
| 5,819,653 A | 10/1998 | McCue | 101/128.21 |
| 5,820,932 A | 10/1998 | Hallman et al. | 427/261 |
| 5,849,066 A * | 12/1998 | Kellett | 106/31.13 |
| 5,852,975 A | 12/1998 | Miyabe et al. | 101/463.1 |
| 5,857,410 A | 1/1999 | Watanabe et al. | 101/116 |
| 5,878,662 A | 3/1999 | McCue | 101/128.4 |
| 5,878,664 A | 3/1999 | Hartka | 101/216 |
| 5,971,535 A * | 10/1999 | Kellett | 106/31.58 |
| 6,196,129 B1 * | 3/2001 | Kellett | 101/454 |
| 2001/0007464 A1 * | 7/2001 | Kellett | 347/96 |

FOREIGN PATENT DOCUMENTS

| | | |
|---|---|---|
| FR | 2 070 452 | 8/1971 |
| FR | 2 11 56 82 | 8/1972 |
| JP | 531 25023 | 11/1978 |
| JP | 57-10145 | 6/1980 |
| JP | 06 00 84 13 | 1/1994 |
| JP | 06 01 41 65 | 1/1994 |
| JP | 061 661 62 | 6/1994 |
| JP | 07 108667 | 4/1995 |
| JP | 07 10 86 67 | 4/1995 |
| JP | 072 055 63 | 8/1995 |
| JP | 08 290 543 | 11/1996 |
| JP | 08 29 05 43 | 11/1996 |
| JP | 08 32 41 45 | 12/1996 |
| JP | 09 02 99 26 | 2/1997 |
| JP | 09 05 81 44 | 3/1997 |
| JP | 09 11 8003 | 5/1997 |
| JP | 092 584 58 | 10/1997 |
| JP | 10 01 07 09 | 1/1998 |
| JP | 10 01 61 76 | 1/1998 |
| JP | 10 02 45 49 | 1/1998 |
| JP | 10 06 70 87 | 3/1998 |
| JP | 10 07 66 24 | 3/1998 |
| JP | 10 07 66 25 | 3/1998 |
| JP | 10 15 70 53 | 6/1998 |
| JP | 10 20 28 22 | 8/1998 |
| JP | 10 20 30 39 | 8/1998 |
| JP | 10 20 43 54 | 8/1998 |
| JP | 10 20 43 56 | 8/1998 |
| JP | 10 21 9163 | 8/1998 |
| JP | 10 21 91 64 | 8/1998 |
| JP | 10 25 93 36 | 9/1998 |
| JP | 10 25 93 38 | 9/1998 |
| JP | 10 26 57 26 | 10/1998 |
| JP | 10 27 27 53 | 10/1998 |
| JP | 10 27 36 11 | 10/1998 |
| JP | 10 27 3612 | 10/1998 |
| JP | 10 27 36 14 | 10/1998 |
| JP | 10 27 98 67 | 10/1998 |
| JP | 10 29 84 72 | 11/1998 |
| JP | 10 29 84 73 | 11/1998 |
| JP | 10 29 84 79 | 11/1998 |
| JP | 10 31 56 17 | 12/1998 |
| JP | 10 31 69 16 | 12/1998 |

(List continued on next page.)

OTHER PUBLICATIONS

"Introduction to Organic Chemistry", Second Ed., Streitwieser, Jr. et al., pp. 1061–1068, 1981, no month available.*
Autotype Launches Zeta, www.Autotype.com/News/Zetal.htm, No Date Available.
Hauserman "Chromium Complexes", No Date Available.
Du Pont Company; "Quilon Chrome Complexes for Release and Surface Treatment Properties, Uses, Storage and Handling"(issued Sep. 3$^{rd}$, 1963).
DuPont Specialty Chemicals "Quilon® Chrome complex for Improved Performance of Polyvinyl Alcohol Paper Coatings, Films, and Adhesives," No Date Available.

Primary Examiner—Helene Klemanski
(74) Attorney, Agent, or Firm—Foley Hoag LLP

(57) ABSTRACT

The systems and methods described herein relate to lithographic printing processes which utilize ink jet techniques to prepare lithographic plates. Images, such as text and pictures, can be printed onto the lithographic plates using an ink formulation comprising a Werner complex of chromium to give rise to a durable image on the lithographic plate.

85 Claims, No Drawings

FOREIGN PATENT DOCUMENTS

| | | |
|---|---|---|
| JP | 10 31 69 17 | 12/1998 |
| JP | 10 31 69 20 | 12/1998 |
| JP | 10 32 48 33 | 12/1998 |
| JP | 10 32 48 34 | 12/1998 |
| WO | WO 97/21146 | 6/1997 |
| WO | WO 97/25206 | 7/1997 |
| WO | WO97/43122 | 11/1997 |
| WO | WO 98/35832 | 8/1998 |

* cited by examiner

SYSTEMS AND METHODS FOR LITHOGRAPHY

This application is based on U.S. Provisional Applications No. 60/154,495, filed Sep. 17, 1999, and No. 60/175,014, filed Jan. 7, 2000, the specifications of which are incorporated by reference herein in their entirety.

FIELD OF THE INVENTION

The systems and methods described herein relate to a process for fabricating a lithographic printing plate using ink jet technology.

BACKGROUND OF THE INVENTION

Lithography and offset printing methods have long been combined in a compatible marriage of great convenience for the printing industry for economical, high speed, high quality image duplication in small runs and large. Known art available to the industry for image transfer to a lithographic plate is voluminous but dominated by the photographic process wherein a hydrophilic plate is treated with a photosensitive coating, exposed via a film image and developed to produce a printable, oleophilic image on the plate.

While preparing lithographic plates by photographic image transfer is relatively efficient and efficacious, it is a multi-step, indirect process of constrained flexibility. Typically, a photographically presensitized (PS) plate is prepared from a hydrophilically surface-treated aluminum. A positive or negative film image of an original hard copy is prepared and the PS plate exposed to the film image, developed, washed and made ready for print operations. Any desired changes in the film image must be made by first changing the original hard copy and repeating the photographic process; hence, the constrained flexibility. As sophisticated and useful as it is to prepare plates by photographic image transfer, the need for a lithographic plate fabricating process that obviates the above problems associated with the photographic process has long been recognized. Clearly, it would be highly beneficial to the printing industry to directly produce a quality printable image on a plate without proceeding through a multi-step photographic process. It would also be highly efficacious if a process were developed whereby changes could be made in an original image in some predetermined manner without incurring the need to correct hard copy and repeat the photography, particularly if those changes could be made "on-line".

Digital computer-aided design of graphical material or text is well known. Electronically derived images of words or graphics presented on the CRT of a digital computer system can be edited and converted to final hard copy by direct printing with impact printers, laser printers or ink jet printers. This manner of printing or producing hard copy is extremely flexible and useful when print runs of no more than a few thousand are required but the print process is not feasible for large runs measured in the tens or hundreds of thousands of pieces. For large runs, printing by lithographic plate is still the preferred process with such plates prepared by the process of photographic image transfer.

It is known that digitized image information can be used in plate making wherein a film is made to express the image according to the image information digitization and an image is formed on the plate by exposure and development. While this method augments flexibility by permitting editing of a digitized image, the method does not overcome the problems associated with the photographic image transfer method of plate fabrication.

Recently, fabrication of lithographic plates by ink jet techniques has been proposed. One such technique is disclosed in Japanese patent application, Kokai 62-25081. This application describes the use of an ink jet system for applying an oleophilic liquid to form an image on the hydrophilic aluminum surface of a lithographic plate. This approach retains the materials and processing of conventional lithographic printing plates and only uses ink jet printing as an alternative in the photomask through which the conventional plates are exposed. U.S. Pat. No. 5,495,803 describes a solid or phase change type of ink jet printing to form a photomask for a printing plate. Thus, these approaches simply are variants of the above platemaking process and do not utilize the ink jet ink image as the hydrophobic image of the plate.

U.S. Pat. No. 4,833,486 discloses the use of an ink jet head to deposit a hot wax upon the surface of a lithographic plate. The hot wax solidifies upon contact with the plate, thus providing an instantaneous printing pattern. Plates prepared by this method are useful for very limited print runs of a few thousand pieces.

There are several advantages for fabricating printing plates by ink jet printers. One advantage is that such processes are environmentally friendly. The complex and potentially polluting chemical preparations and solvents ordinarily used in masking and stripping away photoresist areas of the plates are not always required with ink jet techniques.

The ink jet technology, however, is in its infancy with respect to commercial lithography. Present ink jet techniques cannot produce large or commercially acceptable offset plates. That is, the plates produced by present ink jet techniques have very low plate runs by commercial lithographic standards. Furthermore, there is no ink jet apparatus or process presently available for fabricating large offset plates having a plurality of pages disposed thereon. Indeed, U.S. Pat. No. 4,833,486 teaches that ink jet materials are inexpensive, and therefore, the printing plate may be used a minimum number of times and then discarded. Moreover, in one embodiment of the '486 patent, it is indicated that the system is designed for non-commercial plate production, inasmuch as an office processor system is proposed. Office processing systems ordinarily are not capable of providing the large amounts of digital information required to produce large, commercial lithographic plates.

A further drawback of the apparatus disclosed in the '486 patent is that it makes use of an ink jet medium which may be a wax. Wax is a soft material and will abrade with use under the conditions present for commercial offset printing. Even the so-called hard waxes will not provide the durability required for commercial printing runs of the order of 100,000 cycles. Moreover, waxes do not strongly bond to the printing plate surface, i.e., they prefer to remain on the surface, rather than to actively bond to the substrate.

A liquid ink amenable to ink jet technology that provides a stable, durable image on a lithographic plate would simplify and reduce the costs of applying ink jet technology to lithographic printing techniques.

SUMMARY OF THE INVENTION

The systems and methods disclosed herein provide inks, liquid at room temperature, which comprise a chromium complex, such as a Werner complex. These inks give rise to durable, hydrophobic layers where they are applied to lithographic plates.

Thus, in one aspect, the systems and methods described herein relate to an ink formulation including about 5–90 weight percent water, up to about 75 weight percent of alcohol, up to about 90 weight percent of ether, and a chromium complex. The alcohol may include one or more of ethanol, isopropanol, isobutanol, trifluoroethanol, and 2-butanol. The ether may include one or more of glyme, diglyme, dioxane, and tetrahydrofuran. In certain embodiments, the ink formulation also includes 0.5–5 weight percent N-methylpyrrolidine. In certain embodiments, the chromium complex comprises a Werner complex, such as pentahydroxy(tetradecanato)dichromium. In certain embodiments, the ink formulation also includes a colored dye. In certain embodiments, the ink formulation includes at least 5 weight percent of ether.

In another embodiment, the systems and methods relate to an ink formulation including about 30–70 weight percent water, up to about 50 weight percent of alcohol, up to about 55 weight percent of ether, and a chromium complex. The alcohol may include one or more of ethanol, isopropanol, isobutanol, trifluoroethanol, and 2-butanol. The ether may include one or more of glyme, diglyme, dioxane, and tetrahydrofuran. In certain embodiments, the ink formulation also includes 0.5–5 weight percent N-methylpyrrolidine. In certain embodiments, the chromium complex comprises a Werner complex, such as pentahydroxy(tetradecanato)dichromium. In certain embodiments, the ink formulation also includes a colored dye. In certain embodiments, the ink formulation includes at least 5 weight percent of ether.

In yet another embodiment, the systems and methods relate to an ink formulation including about 40–60 weight percent water, about 15–33 weight percent of alcohol, about 12–32 weight percent of ether, and a chromium complex. The alcohol may include one or more of ethanol, isopropanol, isobutanol, trifluoroethanol, and 2-butanol. The ether may include one or more of glyme, diglyme, dioxane, and tetrahydrofuran. In certain embodiments, the ink formulation also includes 0.5–5 weight percent N-methylpyrrolidine. In certain embodiments, the chromium complex comprises a Werner complex, such as pentahydroxy(tetradecanato)dichromium. In certain embodiments, the ink formulation also includes a colored dye. In certain embodiments, the ink formulation includes at least 5 weight percent of ether.

In a further embodiment, the systems and methods relate to an ink formulation including about 40–60 weight percent water, about 15–33 weight percent of alcohol, and a chromium complex. The alcohol may include one or more of ethanol, isopropanol, isobutanol, trifluoroethanol, and 2-butanol. In certain embodiments, the ink formulation also includes 0.5–5 weight percent N-methylpyrrolidine. In certain embodiments, the chromium complex comprises a Werner complex, such as pentahydroxy(tetradecanato)dichromium. In certain embodiments, the ink formulation also includes a colored dye. In certain embodiments, the ink formulation includes at least 5 weight percent of ether.

In another aspect, the systems and methods provide an ink jet cartridge for use in an ink jet printer, wherein the cartridge contains an ink formulation as described above. In another embodiment, the systems and methods provide an ink jet printer loaded with an ink formulation as described above.

In yet another aspect, the systems and methods provide methods for preparing an ink formulation by combining about 5–90 weight percent water, up to about 75 weight percent of alcohol, up to about 90 weight percent of ether, and a chromium complex. In another embodiment, the systems and methods provide methods for preparing an ink formulation by combining about 40–60 weight percent water, about 15–33 weight percent of alcohol, about 12–32 weight percent of ether, and a chromium complex. In another embodiment, the systems and methods provide methods for preparing an ink formulation by combining about 40–60 weight percent water, about 15–33 weight percent of alcohol, and a chromium complex. In another embodiment, the systems and methods provide methods for preparing an ink formulation by combining about 30–70 weight percent water, up to about 50 weight percent of alcohol, up to about 55 weight percent of ether, and a chromium complex. The alcohol may include one or more of ethanol, isopropanol, isobutanol, trifluoroethanol, and 2-butanol. The ether may include one or more of glyme, diglyme, dioxane, and tetrahydrofuran. In certain embodiments, 0.5–5 weight percent N-methylpyrrolidine may be added to any of the above mixtures. In certain embodiments, the chromium complex comprises a Werner complex, such as pentahydroxy(tetradecanato)dichromium. In certain embodiments, colored dye may be added to any of the above mixtures. In certain embodiments, at least 5 weight percent of ether is combined with the other components as set forth above.

In a further embodiment, the systems and methods described herein relate to a method of preparing lithographic plates by providing a lithographic plate and disposing an image on the lithographic plate with an ink as described above. In certain embodiments, providing a lithographic plate includes providing a lithographic plate having a hydrophilic layer disposed thereon. In certain embodiments, an ink jet printer is used to dispose the image on the lithographic plate.

In one aspect, the systems and methods described herein relate to an ink formulation including about 50.5 weight percent water, about 23.5 weight percent of alcohol, about 21.7 weight percent of ether, and a chromium complex. In certain embodiments, the chromium complex comprises a Werner complex, such as pentahydroxy(tetradecanato) dichromium. In certain embodiments, the ink formulation also includes a colored dye.

In another aspect, the systems and methods provide an ink jet cartridge for use in an ink jet printer, wherein the cartridge contains an ink formulation as described above. In another embodiment, the systems and methods provide an ink jet printer loaded with an ink formulation as described above.

In yet another aspect, the systems and methods provide methods for preparing an ink formulation by combining about 50.5 weight percent water, about 23.5 weight percent of alcohol, about 21.7 weight percent of ether, and a chromium complex.

DETAILED DESCRIPTION OF SELECTED EMBODIMENTS

The description below pertains to several possible embodiments of the invention. It is understood that many variations of the systems and methods described herein may be envisioned by one skilled in the art, and such variations and improvements are intended to fall within the scope of the invention. Accordingly, the invention is not to be limited in any way by the following disclosure of certain illustrative embodiments.

The systems and methods described herein utilize the properties of chromium complexes to form stable, hydrophobic images on lithographic plates. Suitable complexes include the QUILON complexes, Werner complexes of trivalent chromium and carboxylic acids, e.g., myristic or stearic acid, in isopropyl alcohol (Quilon Chrome Complexes, Dupont Corporation, April, 1992). Such complexes, though available in substantially monomeric, liquid solutions, can be dried and/or cured to provide a polymeric, hydrophobic, water-resistant layer on a wide variety of materials. Furthermore, these layers, presumed to be chemically bonded directly to the surface of the treated material, are quite durable, and thus should allow the production of lithographic plates capable of withstanding the stresses of large print runs.

Inks useful in the systems and methods described herein may include visible dyes or colorants, such as dyes used in conventional inks, or may rely entirely on the presence of the chromium complex to provide an image or residue on a lithographic plate. Solutions of chromium complexes may be formulated using aqueous or non-aqueous solvent mixtures. Solvents which may be employed include protic solvents such as water, methanol, ethanol, trifluoroethanol, n-propanol, iso-propanol, n-butanol, 2-butanol, iso-butanol, t-butanol, n-pentanol, and other protic solvents. Aprotic solvents may be employed, either in place of or in addition to protic solvents, such as acetonitrile, acetone, 1,4-dioxane, tetrahydrofuran, N-methylpyrrolidone, dimethylsulfoxide, 1,2-dimethoxyethane, 1,2-diethoxyethane, dimethylformamide, mineral oil, silicon oil, cellusolve solvents, olive oil, and other polar and non-polar aprotic solvents. In certain embodiments, the ink is substantially free of dihydroxylic solvents and glycols, such as ethylene glycol.

Surfaces suitable for receiving inks such as those described above include supports carrying a receiving layer containing at least one hydrophilic material. Suitable hydrophilic materials may be characterized by: receptivity to the ink to provide an image of the desired quality; surfaces bearing suitable moieties for interaction with the chromium complex in the ink to result in a stable, rugged image; and sufficient hydrophilicity and water-fastness for lithographic printing. These characteristics are well understood by those of skill in the art.

Hydrophilic materials which may be employed in the present invention are polyvinyl alcohols and copolymers thereof, cellulose polymers, polyvinyl acetates and copolymers thereof, polyacrylates and copolymers thereof, polymethacrylates and copolymers thereof, polymaleic anhydrides and derivatives and copolymers thereof, polyvinyl acetals and copolymers thereof, polyvinyl pyrrolidones and copolymers thereof, polyamides, or inorganic polymers. In certain embodiments, the hydrophilic material comprises aluminum boehmite, alumina, a silicate, or silica. Such inorganic polymers are typically formed from a sol gel, colloidal particle deposition, or anodization process to provide a gel or network of inorganic polymer.

Supports useful for carrying a hydrophilic layer as described above include paper, plastic or polymer film or sheets, metals such as aluminum, or any other material suitable for use in an ink jet printing system, as is well known in the art.

In certain embodiments, the printed image may need to be treated or cured to fix or polymerize the ink, such as by exposure to heat. Heat treatment may be accomplished by heating the support or hydrophilic material prior to, during, or after the printing process itself. For example, ink may be printed directly onto a heated surface, or the printed image may afterwards be exposed to a heat source.

In certain embodiments, the hydrophilic layer on the support comprises a catalyst to promote reaction of the chromium complex with the hydrophilic layer. Such a catalyst may comprise an alkaline material or a material bearing polar reactive groups, such as hydroxyls (—OH), amines (such as —NH2, and alkylated derivatives thereof), carboxylates (—$CO_2^-$), carboxylic acids (—$CO_2H$), sulfhydryls (—SH), and other suitable groups as will be known to those of skill in the art.

An imaged lithographic printing plate may thus be prepared by providing a support carrying a hydrophilic layer, printing an image on the hydrophilic layer with an ink comprising a chromium complex as described above using an ink jet printer. The image may then optionally be treated, e.g., by heat, to fix the image. In certain embodiments, the support may be heated prior to printing.

In certain embodiments, it may be desirable to provide an ink solution or ink precursor comprising a chromium complex, wherein the ink solution or ink precursor is substantially free of water. Certain complexes of chromium are susceptible to hydrolysis, and suffer from shortened shelf-lives when present in an aqueous solution. Thus, in certain embodiments, a substantially water-free solution of a chromium complex may be combined with an aqueous solution prior to or during the printing process. This can be accomplished by loading an ink jet printer with the two separate solutions, or by providing an ink jet ink cartridge having a solution of a chromium complex in an organic solvent (or mixture of organic solvents) and a separate aqueous solution (or pure water) that can be combined, e.g., in the cartridge or in the printer, as required for printing. The organic solution of chromium may comprise an alcohol or ether, or combinations of alcohols and ethers. The aqueous solution may further comprise a water-miscible solvent, such as an alcohol, e.g., isopropanol, or ether, e.g., tetrahydrofuran. Either or both solutions may further comprise a visible dye, as discussed above.

Thus, an ink jet printer configured for chromium complex-based inks may comprise a mixing mechanism for combining the organic solution of chromium and the aqueous solution, and a printing mechanism for depositing the combination of solutions on a substrate. Because the chromium complexes can form deposits in the mixing and/or printing mechanisms, the printer may further comprise a cleaning mechanism for passing a cleaning solution through these mechanisms to remove or prevent formation of such deposits. In certain embodiments, the aqueous solution, optionally comprising an alcohol such as isopropanol, may be employed as the cleaning solution as well.

Thus, for any of the embodiments and examples described herein, the desired composition of ink containing a chromium complex may be provided as a kit by apportioning the components of the desired composition between two containers, one including the chromium complex and the other containing the water, with the remaining components being divided between the containers in any manner that results in homogenous solutions in the containers. The containers may be joined, e.g., in an ink jet cartridge, or may be separate, e.g., as two independent ink jet cartridges. Where the containers are joined, the two containers may be separated by a destructible or removable barrier, such as a valve or a film, to permit a user to combine the two solutions prior to use.

EXEMPLIFICATION

A number of formulations, such as those described below, have been investigated for use in the above systems and methods.

1: An ink was formulated by preparing a solution of about 5–10% of Quilon C9 in trifluoroethanol. The formation of a precipitate was immediate but a solution was obtained by the addition of a small amount of water.

2: For testing in an Epson Stylus Color 850 printer, trifluoroethanol (5 mL), Quilon C9 (5 mL), and methanol (5 mL) were combined and then loaded into an empty cartridge and printed on the 850 printer.

3: Isopropanol (50 mL), water (50 mL), Quilon C9 (8 mL), Safranine O (0.5 g) and, after 0.22 micron filtration, N-methylpyrrolidone (2 mL) were combined. This formula printed good dot sizes—approximately 60 microns.

4: Isopropanol (50 mL), water (50 mL), Quilon C9 (8 mL), Safranine O (0.5 g) were combined.

5: Water (15 mL), isobutanol (15 mL), isopropanol (15 mL), Quilon C9 (4 mL), Safranine O (0.5 g) and, after 0.22 micron filtration, N-methylpyrrolidone (1.0 mL) were combined. This formula was printed small and regular dots (average of 66 micron in diameter).

6: 4.34 was the measured viscosity of a combination of isopropanol (50 mL), water (50 mL), Quilon C9 (8.0 mL), and Safranine O (0.5 g).

7: 4.23 was the measured viscosity of a combination of isopropanol (50 mL), water (50 mL), Quilon C9 (8.0 mL), Safranine O (0.5 g), and N-methylpyrrolidone (2 mL).

8: The consequence of incorporating of a high concentration of N-methylpyrrolidone into Quilon C9 containing ink was investigated. N-methylpyrrolidone (2 mL) was added to ink 6 (20 mL). This gave an average spot size of 70 microns.

9: Isopropanol (25 mL), Quilon C9 (4 mL), Safranine O (0.25 g) and, after 0.22 micron filtration, acetonitrile (25 mL) were combined.

10: Isopropanol (20 mL), water (20 mL), Quilon C9 (4 mL), Safranine O (0.25 g) and, after 0.22 micron filtration, acetonitrile (20 mL) were combined. The average diameter of the spots was 60 micron and the jetting of this formula was good. 11: Isopropanol (15 mL), water (15 mL), Quilon C9 (4 mL), Safranine O (0.20 g) and, after 0.22 micron filtration, glyme (15 mL) were combined. This formula was terrific on Kodak Photo Paper.

12. We decided to investigate the effect of Quilon C9 on ink performance by (1) formulating inks without Quilon C9 to investigate if dot size is affected by Quilon C9. (2)formulating an ink containing Quilon C to continue the investigation of Quilon concentration vs. dot size. 12a: Formula 8 without the Quilon. This dot sizes printed from this formula were, on average, 50 microns. This dot size is smaller than those recorded when Formula 8 was printed (average diameter of 66 microns). Elimination of the Quilon C9 from the formula also had the effect of increasing the percentage of water and decreasing the percentage of isopropanol. 12b: Formula 11 without the Quilon C9. 12c: This formula contains Quilon C in place of Quilon C9, but is otherwise the same as Formula 5. Water (15 mL), isobutanol, (15 mL), isopropanol (15 mL), Quilon C (4 mL), Safranine O (0.25 g) and, after 0.22 micron filtration, N-methylpyrrolidone (1.0 mL) were combined. Within 2 microns, this formula printed the same dot size as formula 8, 64 microns and 66 microns, respectively.

13: Water (15 mL), isopropanol (18.5 mL), isobutanol (15 mL), Safranine O (0.25 g) and, after filtration, N-methylpyrrolidone (1.0 mL) were combined. This formula jetted beautifully and printed dots with an average dot size of 54 microns.

14: Water (15 mL), isopropanol (15 mL), isobutanol (15 mL), Safranine O (1.0 g) and, post filtration, N-methylpyrrolidone (1.0 mL) were combined.

15: Water (15 mL), isobutanol (15 mL), isopropanol (15 mL), Quilon C9 (4 mL), and Safranine O (1.0 g) were combined.

16: Water (15 mL), isobutanol (15 mL), isopropanol (15 mL), Quilon C9 (4 mL), and N-methylpyrrolidone (1.0 mL) were combined.

17: Water (31 mL), isopropanol (15 mL), Quilon C9 (4 mL), and Safranine O (1.0 g) were combined. This formulation gave good jetting and spot sizes of about 50 microns on photopaper.

18: Water (15 mL), isobutanol (15 mL), isopropanol (11 mL), Quilon C9 (4 mL), Safranine O (1.0 g) and, after 0.22 micron filtration, N-methylpyrrolidone (1.0 mL) were combined. On aluminum, this ink produced spots between 160 microns and 200 microns.

19: Water (60 g), isobutanol (48 g), isopropanol (34.5 g), Quilon C9 (16 g), Safranine O (4.0 g) and, after 0.22 micron filtration, N-methylpyrrolidone (4.0 g) were combined. This formulation jetted beautifully.

20: Formulation of an ink similar to 19 but with a higher percentage of water. Water (100 g), isobutanol (48 g), isopropanol (34.5 g), Quilon C9 (16 g), Safranine O (1.4 g) and, after 0.22 micron filtration, N-methylpyrrolidone (4.0 g) were combined.

21: Water (123 g), isopropanol (60 g), Quilon C9 (16 g), and Safranine O (1.0 g) were combined.

22: Water (60 g), isobutanol (48 g), isopropanol (34.5 g), Quilon C9 (16 g), Safranine O (4.0 g) and, after filtration, N-methylpyrrolidone (4.0 g) were combined.

23: Water (50 g), isobutanol (50 g), isopropanol (20 g), Quilon C9 (10 g), and Safranine O (2.0 g) were combined.

24: A series of inks was prepared:

|   |          | water | isobutanol | isopropanol | Quilon C9 | Safranine O | Dot Size $\mu$M |
|---|----------|-------|------------|-------------|-----------|-------------|------------------|
| a | Grams    | 60    | 40         | 40          | 7.6       | 2.5         | 70               |
|   | Weight % | 40    | 26.6       | 26.6        | 5         | 1.7         |                  |
| b | Grams    | 80    | 20         | 30          | 12        | 4           | 54               |
|   | Weight % | 55    | 13.6       | 20          | 8.2       | 2.7         |                  |
| c | Grams    | 0     | 60         | 40          | 9         | 2           | >100             |
|   | Weight % | 0     | 54         | 36          | 8.1       | 1.8         |                  |

25: A further series of inks was prepared:

|   |          | water | isobutanol | isopropanol | Quilon C9 | Safranine O | NMP | Dot Size (Photopaper) µM |
|---|----------|-------|------------|-------------|-----------|-------------|-----|--------------------------|
| a | Grams    | 80    | 20         | 30          | 12        | 2.5         | 4   | 54                       |
|   | Weight % | 54    | 13.5       | 20          | 8         | 1.6         | 2.7 |                          |
| b | Grams    | 80    | 20         | 40          | 12        | 2.5         | 4   | 52                       |
|   | Weight % | 50    | 12.6       | 25          | 7.5       | 1.6         | 2.5 |                          |
| c | Grams    | 80    | 20         | 40          | 12        | 2.5         | 0   | 56                       |
|   | Weight % | 52    | 13         | 26          | 7.7       | 1.6         | 0   |                          |
| d | Grams    | 80    | 20         | 30          | 9         | 2.5         | 0   | 64                       |
|   | Weight % | 56    | 14         | 21          | 6.5       | 1.7         | 0   |                          |

26: A further series of inks was prepared:

|   |          | water | isobutanol | isopropanol | Quilon C9 | Safranine O | NMP | Dot Size (Photopaper) µM |
|---|----------|-------|------------|-------------|-----------|-------------|-----|--------------------------|
| a | Grams    | 80    | 20         | 40          | 12        | 2.5         | 4   | 54                       |
|   | Weight % | 50    | 12.6       | 25          | 7.5       | 1.6         | 2.5 |                          |
| b | Grams    | 100   | 20         | 40          | 12        | 2.5         | 4   | 54                       |
|   | Weight % | 56    | 11         | 22          | 6.7       | 1.4         | 2.2 |                          |
| c | Grams    | 80    | 20         | 50          | 12        | 2.5         | 4   | 54                       |
|   | Weight % | 47    | 12         | 30          | 7.1       | 1.5         | 2.4 |                          |
| d | Grams    | 123   | 0          | 60          | 16        | 1           | 0   | 64                       |
|   | Weight % | 61.5  | 0          | 30          | 8         | 0.5         | 0   |                          |

27: The inks formulated on this page lack Quilon C9:

|   |          | water | isobutanol | isopropanol | Quilon C9 | Safranine O | NMP | Dot Size (Photopaper) µM |
|---|----------|-------|------------|-------------|-----------|-------------|-----|--------------------------|
| a | Grams    | 60    | 48         | 50.5        | 0         | 2           | 4   | 54                       |
|   | Weight % | 36.5  | 29         | 31          | 0         | 1.2         | 2.4 |                          |
| b | Grams    | 50    | 50         | 30          | 0         | 1.3         | 0   | 56                       |
|   | Weight % | 38    | 38         | 23          | 0         | 0.1         | 0   |                          |
| c | Grams    | 90    | 20         | 52          | 0         | 2.5         | 4   | 50                       |
|   | Weight % | 53    | 11.8       | 31          | 0         | 1.5         | 2.4 |                          |
| d | Grams    | 80    | 20         | 52          | 0         | 2.5         | 4   | 54                       |
|   | Weight % | 50    | 12         | 32.5        | 0         | 1.6         | 2.5 |                          |

28: The following inks were prepared in analogy to 27a–d, but adding Quilon C9:

|   |          | water | isobutanol | isopropanol | Quilon C9 | Safranine O | NMP | Dot Size (Photopaper) µM |
|---|----------|-------|------------|-------------|-----------|-------------|-----|--------------------------|
| a | Grams    | 60    | 48         | 34.5        | 16        | 2           | 4   | 64                       |
|   | Weight % | 36.5  | 29         | 21          | 7.7       | 1.2         | 2.4 |                          |
| b | Grams    | 50    | 50         | 20          | 10        | 1.3         | 0   | 54                       |
|   | Weight % | 38    | 38         | 15.2        | 7.6       | 0.1         | 0   |                          |
| c | Grams    | 90    | 20         | 40          | 12        | 2.5         | 4   | 54                       |
|   | Weight % | 53    | 11.8       | 23.7        | 7.1       | 1.5         | 2.4 |                          |
| d | Grams    | 80    | 20         | 40          | 12        | 2.5         | 4   | 52                       |
|   | Weight % | 50    | 12         | 25          | 7.5       | 1.6         | 2.5 |                          |

29: Formulations analogous to Formulas 28a and 28c were prepared, in which crystal violet replaced Safranine O.

30: The following formulations were prepared:

|   |         | water | iso-propanol | glyme | Quilon C9 | Crystal Violet |     |
|---|---------|-------|--------------|-------|-----------|----------------|-----|
| a | Grams   | 70    | 32.5         | 30    | 5.5       | 0.5            |     |
|   | Weight %| 50.5  | 23.5         | 21.7  | 4         | 0.36           |     |

|   |         | water | isobutanol | iso-propanol | Quilon C9 | Crystal Violet | NMP |
|---|---------|-------|------------|--------------|-----------|----------------|-----|
| b | Grams   | 60    | 48         | 44           | 6.5       | 0.5            | 4   |
|   | Weight %| 36.5  | 29         | 27           | 4         | 0.3            | 2.4 |
| c | Grams   | 90    | 20         | 45.3         | 6.7       | 0.5            | 4   |
|   | Weight %| 54    | 12         | 27.2         | 4         | 0.3            | 2.4 |

|   |         | water | iso-propanol | Quilon C9 | Crystal Violet | NMP |
|---|---------|-------|--------------|-----------|----------------|-----|
| d | Grams   | 123   | 60           | 16        | 1              | 0   |
|   | Weight %| 61.5  | 30           | 8         | 0.5            | 0   |

31: A formulation was prepared:

|          | water | isopropanol | 1,2-diethoxy ethane | Quilon C9 | Crystal Violet | Dot Size (Photopaper) μM |
|----------|-------|-------------|---------------------|-----------|----------------|--------------------------|
| Grams    | 70    | 32.5        | 30                  | 5.5       | 0.5            | 50                       |
| Weight % | 50.5  | 23.5        | 21.7                | 4         | 0.36           |                          |

Quilon C9 is sold by the Du Pont Company as a solution (~9% Cr by weight) of pentahydroxy(tetradecanato)dichromium dissolved largely in isopropanol.

While the invention has been disclosed in connection with the embodiments shown and described in detail, various equivalents, modifications, and improvements will be apparent to one of ordinary skill in the art from the above description. Such equivalents, modifications, and improvements are intended to be encompassed by the following claims.

I claim:
1. An ink formulation, comprising
  about 5–90 weight percent water,
  up to about 75 weight percent of alcohol,
  ether, wherein the ether is present in an amount up to about 90 weight percent, and
  a Werner complex of chromium.
2. The formulation of claim 1, wherein the alcohol includes one or more of ethanol, isopropanol, isobutanol, trifluoroethanol, or 2-butanol.
3. The formulation of claim 1, wherein the ether includes one or more of glyme, diglyme, dioxane, or tetrahydrofuran.
4. The formulation of claim 1, further comprising 0.5–5 weight percent N-methylpyrrolidone.
5. The formulation of claim 1, wherein the Werner complex comprises pentahydroxy(tetradecanato)dichromium.
6. The formulation of claim 1, further comprising a colored dye.
7. The formulation of claim 1, wherein the ether is present in a quantity of at least 5 weight percent.
8. An ink formulation, comprising
  about 30–70 weight percent water,
  up to about 50 weight percent of alcohol,
  ether, wherein the ether is present in an amount up to about 55 weight percent, and
  a Werner complex of chromium.
9. The formulation of claim 8, wherein the alcohol includes one or more of ethanol, isopropanol, isobutanol, trifluoroethanol, or 2-butanol.
10. The formulation of claim 8, wherein the ether includes one or more of glyme, diglyme, dioxane, or tetrahydrofuran.
11. The formulation of claim 8, further comprising 0.5–5 weight percent N-methylpyrrolidone.
12. The formulation of claim 8, wherein the Werner complex comprises pentahydroxy(tetradecanato)dichromium.
13. The formulation of claim 8, further comprising a colored dye.
14. The formulation of claim 8, wherein the ether is present in a quantity of at least 5 weight percent.
15. An ink formulation, comprising
  about 40–60 weight percent water,
  about 15–33 weight percent of alcohol,
  about 12–32 weight percent of ether, and
  a Werner complex of chromium.
16. The formulation of claim 15, wherein the alcohol includes one or more of ethanol, isopropanol, isobutanol, trifluoroethanol, or 2-butanol.
17. The formulation of claim 15, wherein the ether includes one or more of glyme, diglyme, dioxane, or tetrahydrofuran.
18. The formulation of claim 15, further comprising 0.5–5 weight percent N-methylpyrrolidone.
19. The formulation of claim 15, wherein the Werner complex comprises pentahydroxy(tetradecanato)dichromium.
20. The formulation of claim 15, further comprising a colored dye.
21. An ink formulation, comprising
  about 40–60 weight percent water,
  about 15–33 weight percent of alcohol, ether and
  a Werner complex of chromium.
22. The formulation of claim 21, wherein the alcohol includes one or more of ethanol, isopropanol, isobutanol, trifluoroethanol, or 2-butanol.
23. The formulation of claim 21, further comprising 0.5–5 weight percent N-methylpyrrolidone.
24. The formulation of claim 21, wherein the Werner complex comprises pentahydroxy(tetradecanato)dichromium.
25. The formulation of claim 21, further comprising a colored dye.
26. An ink jet cartridge comprising the ink formulation of claim 1, 8, 15, or 21.
27. An ink jet printer loaded with the ink formulation of claim 1, 8, 15, or 21.
28. A method of preparing an ink formulation, comprising combining about 5–90 weight percent water,
up to about 75 weight percent of alcohol,
ether, wherein the ether is present in an amount up to about 90 weight percent, and
a Werner complex of chromium.

29. A method of preparing an ink formulation, comprising combining
about 30–70 weight percent water,
up to about 50 weight percent of alcohol,
ether, wherein the ether is present in an amount up to about 55 weight percent, and
a Werner complex of chromium.

30. A method of preparing an ink formulation, comprising combining
about 40–60 weight percent water,
about 15–33 weight percent of alcohol,
about 12–32 weight percent of ether, and
a Werner complex of chromium.

31. A method of preparing an ink formulation, comprising combining
about 40–60 weight percent water,
about 15–33 weight percent of alcohol, ether and
a Werner complex of chromium.

32. The method of claim 28, 29, 30, or 31, further comprising adding a colored dye.

33. A method of placing an image on a lithographic plate, comprising
providing a lithographic plate, and
depositing an image on the lithographic plate with the ink of claim 1, 8, 15, or 21.

34. The method of claim 33, wherein providing a lithographic plate includes providing a lithographic plate having a hydrophilic layer disposed thereon.

35. The method of claim 33, wherein depositing an image is performed using an ink jet printer.

36. An ink formulation, comprising
about 50.5 weight percent water,
about 23.5 weight percent of isopropanol,
about 21.7 weight percent of glyme, and
a Werner complex of chromium.

37. The formulation of claim 36, wherein the Werner complex comprises pentahydroxy(tetradecanato)dichromium.

38. The formulation of claim 36, further comprising a colored dye.

39. An ink jet cartridge comprising the ink formulation of claim 36.

40. An ink jet printer loaded with the ink formulation of claim 36.

41. A method of preparing an ink formulation, comprising combining
about 50.5 weight percent water,
about 23.5 weight percent of isopropanol,
about 21.7 weight percent of glyme, and
a Werner complex of chromium.

42. A method of placing an image on a lithographic plate, comprising
providing a lithographic plate, and
depositing an image on the lithographic plate with the ink of claim 36.

43. The method of claim 42, wherein providing a lithographic plate includes providing a lithographic plate having a hydrophilic layer disposed thereon.

44. The method of claim 42, wherein depositing an image is performed using an ink jet printer.

45. A method of placing an image on substrate, comprising
providing an ink jet printing apparatus,
loading the ink jet printing apparatus with a first fluid including a Werner complex of chromium and an organic solvent,
loading the ink jet printing apparatus with a second fluid comprising water, and
depositing an image on a substrate by combining the first fluid and the second fluid and disposing the mixture on the substrate.

46. The method of claim 45, wherein the substrate is a lithographic plate.

47. The method of claim 45, further comprising
cycling a cleaning fluid through the printing apparatus to prevent or remove deposits left by the first fluid.

48. The method of claim 47, wherein cycling a cleaning fluid through the printing apparatus comprises cycling the second fluid through the printing apparatus.

49. The method of claim 45, wherein the first fluid or the second fluid further includes a dye.

50. The method of claim 45, wherein loading the ink jet printer with a first fluid comprises loading the ink jet printer with a first fluid including a Werner complex of chromium and an organic solvent comprising an alcohol or an ether.

51. The method of claim 50, wherein loading the ink jet printer with a first fluid comprises loading the ink jet printer with a first fluid including a Werner complex of chromium and glyme.

52. The method of claim 50, wherein loading the ink jet printer with a first fluid comprises loading the ink jet printer with a first fluid including a Werner complex of chromium, isopropanol and glyme.

53. The method of claim 45, wherein loading the ink jet printer with a second fluid comprises loading the ink jet printer with a second fluid comprising water and an alcohol.

54. The method of claim 45, wherein loading the ink jet printer with a first fluid comprises loading the ink jet printer with a first fluid including a Werner complex of chromium and an organic solvent, whereby the first fluid is substantially free of water.

55. A printing system comprising
an ink jet printer,
a first fluid including a Werner complex of chromium and an organic solvent, and
a second fluid including water,
the system configured to provide the first fluid and the second fluid to the ink jet printer for disposing a mixture of the fluids on a substrate.

56. The system of claim 55, wherein the organic solvent is an alcohol or an ether.

57. The system of claim 56, wherein the organic solvent is isopropanol or glyme.

58. The system of claim 55, wherein the second fluid further comprises an alcohol.

59. The system of claim 58, wherein the alcohol is isopropanol.

60. The system of claim 55, wherein at least one of the first fluid and the second fluid further comprises a dye.

61. The system of claim 55, wherein the first fluid is substantially free of water.

62. The system of claim 55, wherein the ink jet printer includes
   a mixing mechanism for combining the first fluid and the second fluid, and
   a printing mechanism for depositing the combined fluids on a substrate.

63. The system of claim 62, wherein the ink jet printer further includes
   a cleaning mechanism for passing a cleaning solution through the mixing mechanism or the printing mechanism.

64. The system of claim 63, wherein the cleaning mechanism is configured to pass the second solution, substantially excluding the first solution, through the mixing mechanism or the printing mechanism.

65. An ink jet ink cartridge comprising
   a housing including at least two containers,
   a first fluid including a Werner complex of chromium and an organic solvent disposed in a first container, and
   a second fluid including water disposed in a second container.

66. The ink cartridge of claim 65, wherein the organic solvent is an alcohol or an ether.

67. The ink cartridge of claim 66, wherein the organic solvent is isopropanol or glyme.

68. The ink cartridge of claim 65, wherein the second fluid further comprises an alcohol.

69. The ink cartridge of claim 68, wherein the alcohol is isopropanol.

70. The ink cartridge of claim 65, wherein at least one of the first fluid and the second fluid further comprises a dye.

71. The ink cartridge of claim 65, wherein the first fluid is substantially free of water.

72. The ink cartridge of claim 65, wherein the cartridge comprises a mechanism for mixing the first fluid with the second fluid.

73. A kit for preparing an ink formulation, the ink formulation comprising
   about 5–90 weight percent water,
   up to about 75 weight percent of alcohol,
   ether, wherein the ether is present in an amount up to about 90 weight percent, and
   a Werner complex of chromium,
   the kit comprising a first container comprising a substantially water-free solution of the Werner complex in alcohol and/or ether, and a second container comprising water, whereby the ink formulation can be prepared by combining predetermined amounts of the contents of the containers in the kit.

74. The kit of claim 73, wherein the alcohol includes one or more of ethanol, isopropanol, isobutanol, trifluoroethanol, or 2-butanol.

75. The kit of claim 73, wherein the ether includes one or more of glyme, diglyme, dioxane, or tetrahydrofuran.

76. The kit of claim 73, further comprising 0.5–5 weight percent N-methylpyrrolidone.

77. The kit of claim 73, wherein the Werner complex comprises pentahydroxy(tetradecanato)dichromium.

78. The kit of claim 73, further comprising a colored dye.

79. A kit for preparing an ink formulation, the ink formulation comprising
   about 30–70 weight percent water,
   up to about 50 weight percent of alcohol,
   ether, wherein the ether is present in an amount up to about 55 weight percent, and
   a Werner complex of chromium, and
   the kit comprising a first container comprising a substantially water-free solution of the Werner complex in alcohol and/or ether, and a second container comprising water, whereby the ink formulation can be prepared by combining predetermined amounts of the contents of the containers of the kit.

80. A kit for preparing an ink formulation, the ink formulation comprising
   about 40–60 weight percent water,
   about 15–33 weight percent of alcohol,
   about 12–32 weight percent of ether, and
   a Werner complex of chromium, and
   the kit comprising a first container comprising a substantially water-free solution of the Werner complex in alcohol and/or ether, and a second container comprising water, whereby the ink formulation can be prepared by combining predetermined amounts of the contents of the containers of the kit.

81. A kit for preparing an ink formulation, the ink formulation comprising
   about 40–60 weight percent water,
   about 15–33 weight percent of alcohol, ether and
   a Werner complex of chromium, and
   the kit comprising a first container comprising a substantially water-free solution of the Werner complex in alcohol, and a second container comprising water, whereby the ink formulation can be prepared by combining predetermined amounts of the contents of the containers of the kit.

82. A kit for preparing an ink formulation, the ink formulation comprising
   about 50.5 weight percent water,
   about 23.5 weight percent of isopropanol,
   about 21.7 weight percent of glyme, and
   a Werner complex of chromium, and
   the kit comprising a first container comprising a substantially water-free solution of the Werner complex in isopropanol and/or glyme, and a second container comprising water, whereby the ink formulation can be prepared by combining predetermined amounts of the contents of the containers of the kit.

83. The kit of claim 82, wherein the first container comprises a substantially water-free solution of the Werner complex in glyme, and the second container comprises an aqueous solution of isopropanol.

84. A system for printing an image on a lithographic plate, comprising
   an ink jet printer,
   an ink jet ink cartridge disposed in the ink jet printer, the cartridge including at least two containers,
   a first fluid comprising a substantially water-free solution of a Werner complex of chromium in an organic solvent in a first container,
   a second fluid comprising water disposed in a second container, and
   a mixing mechanism for combining a predetermined amount of the first fluid with a predetermined amount of the second fluid,
   whereby a mixture of the first fluid and the second fluid may be disposed on a lithographic plate.

85. A method for printing an image on a lithographic plate, comprising providing an ink jet printer, having disposed therein an ink jet ink cartridge containing
  a first fluid comprising a substantially water-free solution of a Werner complex of chromium in an organic solvent, and
  a second fluid comprising water, combining an amount of the first fluid with an amount of the second fluid, and disposing the combination of fluids on a lithographic plate.

* * * * *